(12) United States Patent
Takahashi

(10) Patent No.: US 7,046,889 B2
(45) Date of Patent: May 16, 2006

(54) DISPERSION-SHIFTED FIBER

(75) Inventor: Fumio Takahashi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 260 days.

(21) Appl. No.: 10/656,273

(22) Filed: Sep. 8, 2003

(65) Prior Publication Data

US 2004/0202439 A1    Oct. 14, 2004

(30) Foreign Application Priority Data

Sep. 9, 2002    (JP) .............................. 2002-263228

(51) Int. Cl.
*G02B 6/02*    (2006.01)

(52) U.S. Cl. .................. 385/127; 385/123; 385/124; 385/125; 385/126

(58) Field of Classification Search ............... 385/123, 385/124, 125, 126, 127
See application file for complete search history.

(56) References Cited

U.S. PATENT DOCUMENTS

| | | | |
|---|---|---|---|
| 6,282,354 B1 | 8/2001 | Jones et al. | |
| 6,522,819 B1 * | 2/2003 | Shimotakahara et al. | ... 385/123 |
| 6,556,758 B1 * | 4/2003 | Kato | ......................... 385/127 |

* cited by examiner

*Primary Examiner*—Jennifer Doan
(74) *Attorney, Agent, or Firm*—Oblon, Spivak, McClellnad, Maier & Neustadt, P.C.

(57) ABSTRACT

A dispersion shifter fiber, which has zero dispersion wavelength on a long wavelength side beyond 1640 nm, a wavelength dispersion of −1.0 to −10.0 ps/nm/km at a wavelength range of 1530–1625 nm, a dispersion slope of less than 0.07 ps/nm²/km, a polarization mode dispersion of not more than 0.1 ps/(km)$^{1/2}$ at a wavelength of 1550 nm, and a core cross-sectional area of 40–70 μm² at the wavelength of 1550 nm.

11 Claims, 2 Drawing Sheets

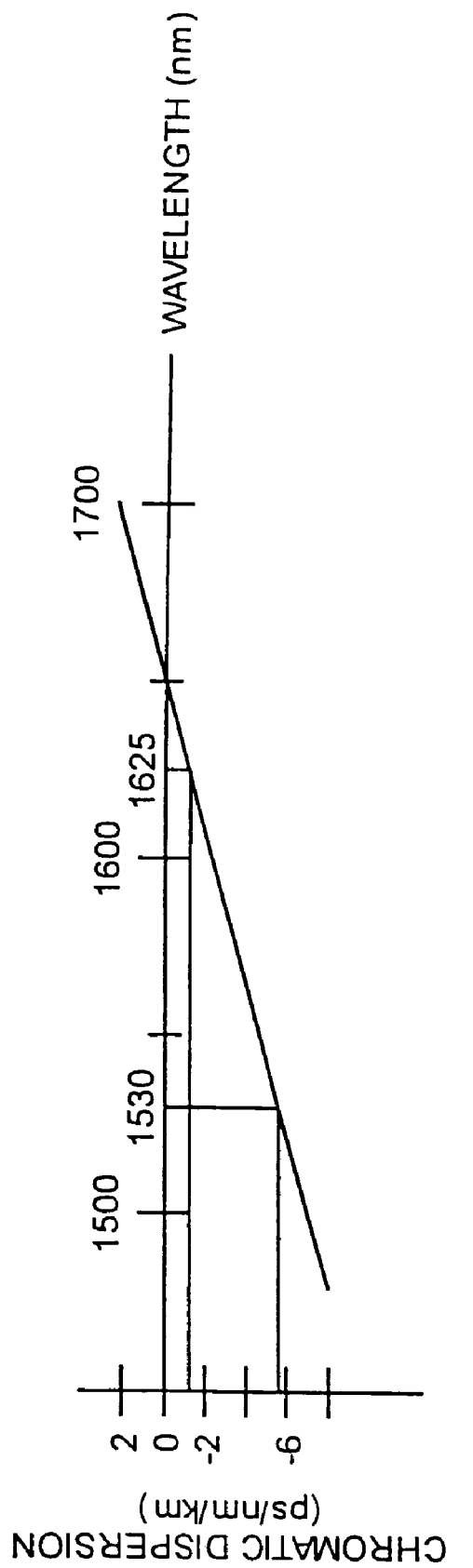

DISPERSION-SHIFTED FIBER

BACKGROUND OF THE INVENTION

Field of the Invention

The present invention relates to a dispersion-shifted fiber used as an optical transmission line in a wavelength division multiplexing (WDM) transmission system.

Description of the Related Art

A WDM transmission system using an optical fiber network is capable of transmitting a large capacity of information over a long distance. The WDM transmission system typically includes a transmitter that transmits multi-wavelength optical signals, an optical fiber through which the optical signals propagates, a receiver that receives the optical signals, and an optical amplifier that amplifies the optical signals. In such a WDM transmission system, attempts have been conducted to increase the transmission capacity by broadening the wavelength bandwidth of the optical signals.

An optical fiber intended for broadening the wavelength bandwidth has been disclosed (for example, see U.S. Pat. No. 6,282,354). The optical fiber has a zero dispersion wavelength in the range between 1575 nm and 1595 nm, a mode field diameter of 7.9 μm to 9.1 μm, a dispersion slope of not more than 0.10 ps/nm²/km, a cutoff wavelength of not more than 1500 nm, and a transmission loss of not more than 0.203 dB/km at the wavelength of 1550 nm. Further, according to an embodiment of the optical fiber, the dispersion slope value is 0.07 to 0.08 ps/nm²/km (see Table 5 of U.S. Pat. No. 6,282,354).

On the other hand, the wavelength bandwidth that gives an appropriate gain in an optical fiber amplifier has been a subject of intense research in recent years. As a result, it is now possible to amplify the optical signals in a wavelength range between 1530 nm and 1625 nm. However, the optical fiber disclosed in the U.S. Pat. No. 6,282,354 is intended for optical signals in a wavelength range between 1525 nm and 1565 nm, and therefore, it is not suitable for using in a longer wavelength range between 1565 nm and 1625 nm.

SUMMARY OF THE INVENTION

The dispersion shifted fiber according to still another aspect of the present invention includes a central core that surrounds an optical axis center, the central core having a first refractive index, a second core that surrounds the central core, the second core having a second refractive index, the second refractive index being less than the first refractive index, a third core that surrounds the second core, the third core having a third refractive index, the third refractive index being greater than the second refractive index, and a clad that surrounds the third core, the clad having a fourth refractive index, the fourth refractive index being less than the third refractive index.

It is an object of the present invention to solve the above problem in the conventional technology.

The dispersion-shifted fiber according to one aspect of the present invention has a zero dispersion wavelength that is longer than 1640 nanometer, a dispersion of −1.0 ps/nm/km to −10.0 ps/nm/km in a wavelength range between 1530 nanometer and 1625 nanometer, a dispersion slope of a positive value less than 0.07 ps/nm²/km in the wavelength range between 1530 nanometer and 1625 nanometer, a polarization mode dispersion of not more than 0.1 ps/(km)$^{1/2}$ at a wavelength of 1550 nanometer, and an effective area of 40–70 μm² at the wavelength of 1550 nanometer.

The other objects, features and advantages of the present invention are specifically set forth in or will become apparent from the following detailed descriptions in conjunction with the accompanying drawings.

BRIEF DESCRIPTION OF THE DRAWINGS

FIG. 2 is a graph of dispersion characteristics of the dispersion-shifted fiber.

DETAILED DESCRIPTION

Exemplary embodiments of a dispersion-shifted fiber according to the present invention will be explained with reference to the accompanying drawings.

Figure 1A:
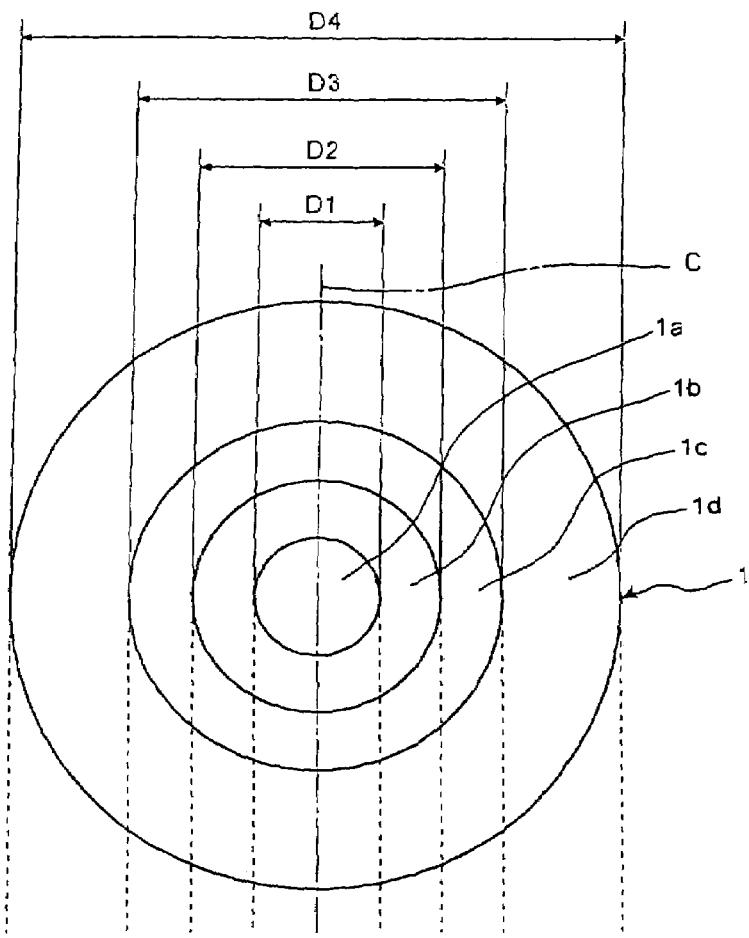
FIG. 1A is a schematic diagram of a dispersion-shifted fiber according to the present invention.
Figure 1B:
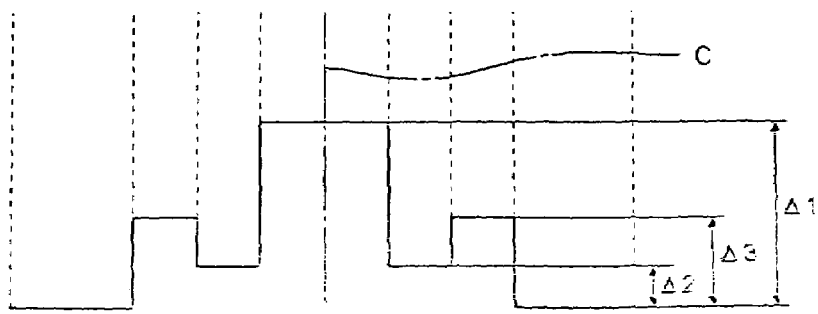
FIG. 1B is a refractive index profile of the dispersion-shifted fiber.

FIG. 1A is a schematic diagram of a dispersion-shifted fiber according to the present invention. FIG. 1B is a refractive index profile of the dispersion-shifted fiber. The dispersion-shifted fiber 1 has a center core 1a (refractive index=n1, outer diameter=D1) that is centered on an optical axis center C. A second core 1b (refractive index=n2, outer diameter=D2), a third core 1c (refractive index=n3, outer diameter=D3), and a clad 1d (refractive index=n4, outer diameter=D4) are sequentially formed from the center around the center core 1a in a concentric manner. The refractive index of each part of the dispersion-shifted fiber 1 has been set to satisfy the relation n1>n3>n2>n4. In this way, the relative index differences of the center core 1a, the second core 1b, and the third core 1c with respect to the clad 1d are set to positive values. More suitably, the relative refractive index difference Δ1 (%) of the center core 1a with respect to the clad 1d is $0.7 \leq \Delta1 \leq 0.9$.

The dispersion-shifted fiber having such a refractive index profile is fabricated with quartz glass as a base material, by drawing an optical preform that a dopant (GeO$_2$) is dopped in a center core region, a second core region, and a third core region corresponding to the center core, the second core, and the third core and the clad, respectively.

As shown in FIG. 2, the zero dispersion wavelength for the dispersion-shifted fiber 1 exists on a long wavelength side beyond 1640 nm. In the wavelength range between 1530 nm and 1625 nm, the wavelength dispersion of the dispersion-shifted fiber 1 is −1.0 ps/nm/km to −10.0 ps/nm/km and the positive dispersion slope is less than 0.07 ps/nm2/km in the wavelength range between 1530 nm and 1625 nm. Further, a polarization mode dispersion of the dispersion-shifted fiber at a wavelength of 1550 nm is not more than 0.1 ps/(km)½ and the effective area at the wavelength of 1550 nm is 40 μm2 to 70 μm2. In the trial-produced dispersion-shifted fiber 1 having the structure shown in FIG. 1A, the outer diameter D1 of the center core 1a was 5.4 μm, the outer diameter D2 of the second core 1b was 9.8 μm, the outer diameter D3 of the third core 1c was 20 μm, and the outer diameter D4 of the clad 1d was 125 μm. Further, the relative index difference Δ1 of the center core 1a was 0.82%, the relative index difference Δ2 of the second core was 0.05%, and the relative index difference of the third core Δ3 was 0.3%. The dispersion-shifted fiber 1 drawn from an optical preform was exposed to a deutrium containing atmosphere for about three hours.

The measured characteristics of the trial-produced dispersion-shifted fiber 1 are as follows. The zero dispersion wavelength is 1664 nm, the wavelength dispersion occurring in the wavelength range between 1530 nm and 1625 nm is −2.0 ps/nm/km to −7.1 ps/nm/km, the dispersion slope is 0.056 ps/nm²/km, the polarization mode dispersion at the wavelength of 1550 nm is 0.079 ps/nm/(km)$^{1/2}$, and the effective area at the wavelength of 1550 nm is 53 μm².

The transmission losses at wavelengths of 1550 nm, 1310 nm, and 1383 nm are 0.192 dB/km, 0.37 dB/km, and 0.33 dB/km, respectively. Further, there is no increase in the transmission loss prior to and after hydrogen aging at 1383 nm. A cable cut off wavelength at a length of 22 m is 1222 nm. As a result, the dispersion-shifted fiber 1 is suitable for transmitting a large capacity of multi-wavelength optical signals ranging across a broad wavelength band between 1530 nm and 1625 nm over a long distance.

Further, the dispersion-shifted fiber 1 is suitable for a high-speed optical transmission. The deterioration of an optical signal waveform caused by a non-linear optical phenomenon could be suppressed. Further, the transmission loss due to bending could also be suppressed.

To sum up, the dispersion-shifted fiber according to the present invention is suitable for a wideband WDM transmission system.

In the present invention, hydrogen aging test in accordance with the method specified in Section C3.1, Annex C of IEC 60793-2-50 (First Edition 2002-01) is carried out. Here, the wavelength $\lambda y$ is taken as 1383 nm. The cable cut off wavelength at the length of 22 m corresponds to the cable cut off wavelength $\lambda cc$ specified in ITU-T (International Telecommunication Union) G.650. Other terms unless particularly defined in this document are in accordance with ITU-T G.650.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A dispersion-shifted fiber having
   a zero dispersion wavelength that is longer than 1640 nanometer;
   a dispersion of −1.0 ps/nm/km to −10.0 ps/nm/km in a wavelength range between 1530 nanometer and 1625 nanometer;
   a dispersion slope of a positive value less than 0.07 ps/nm$^2$/km in the wavelength range between 1530 nanometer and 1625 nanometer;
   a polarization mode dispersion of not more than 0.1 ps/(km)$^{1/2}$ at a wavelength of 1550 nanometer; and
   an effective area of 40–70 μm$^2$ at the wavelength of 1550 nanometer.

2. The dispersion-shifted fiber according to claim 1, wherein a transmission loss at the wavelength of 1550 nanometer is 0.200 dB/km or less.

3. The dispersion-shifted fiber according to claim 2, comprising
   a center core having a first refractive index at the center;
   a second core that surrounds the center core, the second core having a second refractive index, the second refractive index being less than the first refractive index,
   a third core that surrounds the second core, the third core having a third refractive index, the third refractive index being greater than the second refractive index; and
   a clad that surrounds the third core, the clad having a fourth refractive index, the fourth refractive index being less than the third refractive index.

4. The dispersion-shifted fiber according to claim 2, wherein the transmission loss at a wavelength of 1383 nanometer is less than the transmission loss at a wavelength of 1310 nanometer.

5. The dispersion-shifted fiber according to claim 4, wherein an increase in the transmission loss at the wavelength of 1383 nanometer after hydrogen aging is not more than 0.04 dB/km.

6. The dispersion-shifted fiber according to claim 5, wherein a cable cut off wavelength at a length of 22m is not more than 1300 nanometer.

7. The dispersion-shifted fiber according to claim 6, comprising:
   a center core having a first refractive index at the center;
   a second core that surrounds the center core, the second core having a second refractive index, the second refractive index being less than the first refractive index;
   a third core that surrounds the second core, the third core having a third refractive index, the third refractive index being greater than the second refractive index; and
   a clad that surrounds the third core, the clad having a fourth refractive index, the fourth refractive index being less than the third refractive index.

8. The dispersion-shifted fiber according to claim 4, comprising:
   a center core having a first refractive index at the center;
   a second core that surrounds the center core, the second core having a second refractive index, the second refractive index being less than the first refractive index;
   a third core that surrounds the second core, the third core having a third refractive index, the third refractive index being greater than the second refractive index; and
   a clad that surrounds the third core, the clad having a fourth refractive index, the fourth refractive index being less than the third refractive index.

9. The dispersion-shifted fiber according to claim 5, comprising:
   a center core having a first refractive index at the center;
   a second core that surrounds the center core, the second core having a second refractive index, the second refractive index being less than the first refractive index:
   a third core that surrounds the second core, the third core having a third refractive index, the third refractive index being greater than the second refractive index; and
   a clad that surrounds the third core, the clad having a fourth refractive index, the fourth refractive index being less than the third refractive index.

10. The dispersion-shifted fiber according to claim 1, comprising:
    a center core having a first refractive index at the center;
    a second core that surrounds the center core, the second core having a second refractive index, the second refractive index being less than the first refractive index;
    a third core that surrounds the second core, the third core having a third refractive index, the third refractive index being greater than the second refractive index; and
    a clad that surrounds the third core, the clad having a fourth refractive index, the fourth refractive index being less than the third refractive index.

11. The dispersion-shifted fiber according to claim 10, wherein relative refractive index differences of the center core the second core and the third core with respect to the clad are set to positive values.

* * * * *